United States Patent
McBrearty

(10) Patent No.: US 10,924,336 B2
(45) Date of Patent: Feb. 16, 2021

(54) METHOD FOR DYNAMICALLY CONTROLLING THE MEMBERSHIP OF A ZONE IN A CLOUD ENVIRONMENT

(71) Applicant: International Business Machines Corporation, Armonk, NY (US)

(72) Inventor: Gerald McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/245,019

(22) Filed: Jan. 10, 2019

(65) Prior Publication Data

US 2020/0228398 A1    Jul. 16, 2020

(51) Int. Cl.
G06F 15/173    (2006.01)
H04L 12/24    (2006.01)
H04L 12/933    (2013.01)
H04L 29/08    (2006.01)

(52) U.S. Cl.
CPC .......... H04L 41/0803 (2013.01); H04L 49/10 (2013.01); H04L 67/1097 (2013.01)

(58) Field of Classification Search
CPC .. H04L 41/0803; H04L 49/01; H04L 67/1097
USPC ....................................................... 709/223
See application file for complete search history.

(56) References Cited

U.S. PATENT DOCUMENTS

| | | | |
|---|---|---|---|
| 9,535,918 B1 | 1/2017 | Reddy | |
| 9,912,549 B2 | 3/2018 | Rieke | |
| 10,359,958 B2* | 7/2019 | Jinno | H04L 67/1097 |
| 2011/0252135 A1* | 10/2011 | Kudo | G06F 9/5044 |
| | | | 709/224 |
| 2013/0046892 A1* | 2/2013 | Otani | H04L 29/06 |
| | | | 709/226 |
| 2014/0297782 A1* | 10/2014 | Umbehocker | G06F 3/0622 |
| | | | 709/216 |
| 2016/0248599 A1* | 8/2016 | Berman | H04L 12/4641 |
| 2017/0048322 A1* | 2/2017 | Desanti | H04L 67/1097 |
| 2018/0020019 A1 | 1/2018 | Rieke et al. | |
| 2018/0026863 A1* | 1/2018 | Hughes | H04L 43/06 |
| | | | 709/224 |
| 2018/0246652 A1* | 8/2018 | Lam | G06F 13/4022 |

(Continued)

OTHER PUBLICATIONS

Authors et. al.: Disclosed Anonymously, "Policy-driven method and system to automate the provisioning of shared storage space in a cloud environment," IP.com No. IPCOM000220017D, IP.com Electronic Publication Date: Jul. 18, 2012, 5 pages.

(Continued)

*Primary Examiner* — Alan S Chou
(74) *Attorney, Agent, or Firm* — Patterson + Sheridan, LLP

(57) ABSTRACT

Method and apparatus for dynamically updating a zoning methodology on a fibre channel (FC) fabric are provided. One example method generally includes receiving a request to provision storage to a virtual machine (VM) via the FC fabric connecting a host machine of the VM to a storage area network (SAN) and determining a dynamic zoning methodology to use for the VM. The method further includes determining a previous zoning methodology in use by the fabric, updating the FC fabric from the previous zoning methodology to the dynamic zoning methodology by modifying a zoning table of the FC fabric and activating the dynamic zoning methodology on the FC fabric.

15 Claims, 8 Drawing Sheets

(56) References Cited

U.S. PATENT DOCUMENTS

| | | | |
|---|---|---|---|
| 2019/0020603 A1* | 1/2019 | Subramani | H04L 41/0893 |
| 2019/0146719 A1* | 5/2019 | McBrearty | G06F 3/0665 |
| | | | 711/154 |
| 2019/0312783 A1* | 10/2019 | Janardhana | H04L 49/357 |
| 2020/0169604 A1* | 5/2020 | Clark | H04L 67/1097 |

OTHER PUBLICATIONS

OL-19448-02, Cisco MDS NX-OS Release 4.2(x), "Configuring and Managing Zones," Chapter 5, 50 pages.

Authors et. al.: Disclosed Anonymously. "Adaptive Data Provisioning for cloud," IP.com No. IPCOM000236799D, IP.com Electronic Publication Date: May 16, 2014, 3 pages.

Authors et. al.: Disclosed Anonymously, "Managing data locations in a cloud," IP.com No. IPCOM000227725D, IP.com Electronic Publication Date: May 13, 2013, 6 pages.

Cisco, "Nexus 5000 Series Switch Fabric Manager Software Configuration Guide", Software Release 4.0, Jun. 2008.

\* cited by examiner

METHOD FOR DYNAMICALLY CONTROLLING THE MEMBERSHIP OF A ZONE IN A CLOUD ENVIRONMENT

BACKGROUND

The present invention relates to storage area networks (SANs) used by virtual machines (VMs), and more specifically, managing zones allocated for fibre channel (FC) SANs in cloud computing environment.

Data centers typically include a number of host machines that provide processing for VMs connected to storage devices for the VMs via a FC fabric of switches, routers or other networking devices. For a particular VM, the FC fabric connects a port associated with the VM (also called an initiator port) and a node of the storage device (also called a target port). Typically, the FC fabric separates connections into various zones, where each entity in a zone is visible to other entities in the zone. Further, entities within a given zone can neither access or view entities outside of that zone, nor hide from other entities in that zone. That is, if a first VM and a second VM are the only entities in a zone, the first VM (and the first VM's storage) is, by way of membership in that zone, visible to the second VM (and the second VM's storage), and no other VMs are visible to either the first VM or the second VM.

In general, smaller zones (zones with fewer entities or connections) enhance security by limiting the visibility of VMs within the zone. Thus, a zoning scheme where a single zone consists of one imitator and one target (called initiator-target zoning) may be preferred in some cases. At the same time, for data centers with thousands or tens of thousands of VMs, managing large number of zones can become taxing for the data center. That is, initiator-target zoning may result in more zones than the data center can effectively manage. Data center administrators therefore attempt to strike a balance by selecting a zoning scheme that isolates VMs where possible, but one that does not result in an unmanageable number of zones.

Although several zoning schemes are possible, one issue with existing methods of FC zoning is that a zoning scheme is static for a given FC fabric. That is, existing FC fabrics are unable to implement a different zoning scheme than originally specified during production use, requiring an administrator to manually update the zoning scheme. In many cases, administrators are unable to effectively update zoning in real time, as by the time an administrator assesses a problem (e.g., the zoning table is overfull) the situation on the FC fabric may have changed and a different problem (or problems) may be present. Further, if using existing FC fabric zoning, an administrator of a VM data center may select a zoning scheme resulting in a low number of zones (such as zoning based on a host or zoning based on clusters), so that the VM data center can deploy large numbers of VMs without overfilling the zoning table. However, such a choice can result in less security, as discussed above, compared with a zoning scheme resulting in a high number of zones. Administrators often make this choice as there is no practical way to update the zoning scheme of an FC fabric after being initialized. Therefore, systems and methods are needed which can dynamically update the zoning policies for FC fabrics.

SUMMARY

Certain embodiments provide a method for dynamically updating a zoning methodology on a fibre channel (FC) fabric. The method generally includes receiving a request to provision storage to a virtual machine (VM) via the FC fabric connecting a host machine of the VM to a storage area network (SAN) and determining a dynamic zoning methodology to use for the VM. The method further includes determining a previous zoning methodology in use by the fabric, updating the FC fabric from the previous zoning methodology to the dynamic zoning methodology by modifying a zoning table of the FC fabric and activating the dynamic zoning methodology on the FC fabric.

Another embodiment includes a computing device comprising a processor and memory including instructions that cause the computing device to perform the method for dynamically updating a zoning methodology on an FC fabric described above.

Still another embodiment includes a computer program product for dynamically updating a zoning methodology on an FC fabric, the computer program product comprising a computer-readable storage medium having computer-readable program code embodied therewith. The computer-readable program code is executable by one or more computer processors to receive a request to provision storage to a virtual machine (VM) via the FC fabric connecting a host machine of the VM to a storage area network (SAN) and determine a dynamic zoning methodology to use for the VM. The computer-readable program code is further executable by the one or more computer processors to determine a previous zoning methodology in use by the fabric, update the FC fabric from the previous zoning methodology to the dynamic zoning methodology by modifying a zoning table of the FC fabric, and activate the dynamic zoning methodology on the FC fabric.

DETAILED DESCRIPTION

The present disclosure relates to systems and method for dynamically determining zoning schemes, that is, to determining the membership of zones of a fibre channel (FC) fabric, which can be performed by an orchestration engine of a virtual machine (VM) data center. In general, the orchestration engine directs the execution of VMs in the data center. For example, the orchestration engine processes requests to create new VMs on host machines as well as requests to provision storage for VMs. Host machines typically access storage provisioned by the orchestration engine across the FC fabric. After receiving a request to provision storage for a VM, the orchestration engine may begin a process to determine if the current zoning scheme used on the FC fabric is compatible with the VM and the current state of the FC fabric.

First, the orchestration engine may determine if the VM itself specifies any particular zoning rules. For instance, a VM may include a rule that specifying that the VM should participate in only certain zoning schemes or that prohibits the VM from being used in particular zoning schemes.

If the VM itself does not specify any particular zoning rules, the orchestration engine may instead rely on local zoning rules in order to determine a zoning scheme for use on the FC fabric. For example, a first local rule may specify peer zoning if the FC fabric supports peer zoning, while a second local rule may specify initiator-target zoning if the zoning table is less than 50% of maximum capacity. As in the example of the second local rule, the orchestration engine may access a zoning table of the FC fabric in order to determine a zoning scheme to use on the FC fabric. A zoning table is a data structure that includes information relating to active zones of an FC fabric.

Once the orchestration engine determines a zoning scheme to use, whether by a rule of the VM of from a local rule, the orchestration engine interfaces with the FC fabric to implement the determined zoning scheme. To implement the new zoning structure, the orchestration engine generates a new set of zones based on the zoning scheme and activates the new set of zones on the FC fabric. Activating the zones means that the visibility of the VMs or the ability of a particular VM to see other VMs may change. Thereafter, the orchestration engine may remove zones from the initial zoning scheme that are no longer in use.

Dynamically determining zoning schemes allows for more tailored use of zones within FC fabrics. Embodiments presented here disclose an orchestration engine that can use the best suited zoning scheme for an FC fabric by dynamically changing a zoning scheme in use by the FC fabric. Additionally, dynamically updating zoning schemes increases the flexibility of users in provisioning VM data centers.

Figure 1:
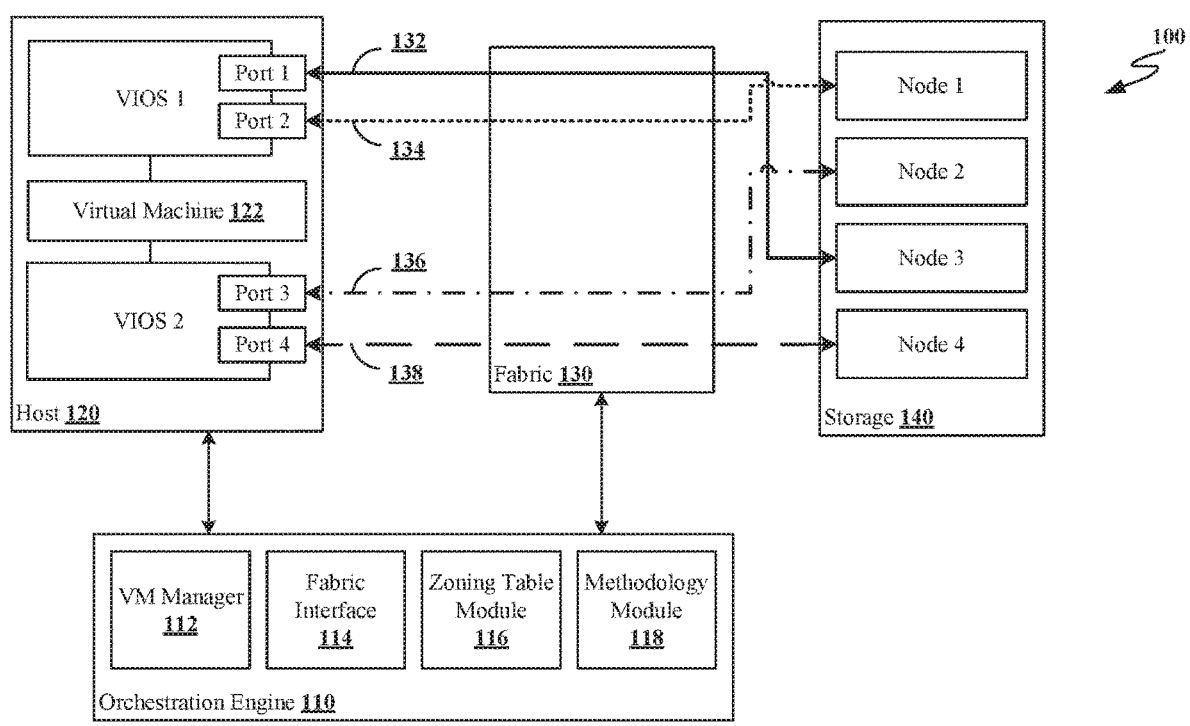
FIG. 1 depicts an example VM datacenter.

FIG. 1 depicts an example VM datacenter 100. VM datacenter 100 includes orchestration engine 110, host 120, fabric 130 and storage 140. VM datacenter 100 is a simplified example of a production VM datacenter, which may have more host machines and storage devices than shown here. In general VMs executing on host 120 access storage resources of storage 140 via fabric 130. Orchestration engine 110 is responsible for creating new VMs to execute on host machines as well as provisioning storage resources for VMs, which involves setting zoning policies and creating zones. VM datacenter 100 and other examples provided herein may be PowerVM® hardware environments. However, the methods and techniques described herein are not limited to PowerVM® environments and are applicable to other VM computing or hardware environments or other types of VM hypervisors.

In this example orchestration engine 110 is a computing device that interfaces with host 120 and fabric 130. Orchestration engine 110 is shown in this example as a separate device from host 120, although in some embodiments the functions of orchestration engine 110 may be performed by a software module executing on host 120 or another host machine. Orchestration engine 110 includes VM manager 112, fabric interface 114, zoning table module 116 and methodology module 118.

VM Manager 112 is a software routine executing within orchestration engine 110 that manages VMs of VM datacenter 100, such as VM 122 of host 120. In general, orchestration engine 110 may receive a request to create a new VM (such as from an operator or administrator of VM datacenter 100) and create a new VM on a host machine of VM datacenter 100 using VM manager 112. VM manager 112 also manages VMs for the duration of a VMs lifecycle, including provisioning additional processing or storage resources as needed and available, or terminating a VM at the conclusion of activity of the VM. VM manager 112 collects and stores data related to the VMs, such as the number of Virtual Input/output Servers (VIOS) or ports used by the VMs.

Fabric interface 114 is a software routine executing within orchestration engine that manages fabric 130, such as by monitoring the activity of fabric 130 or changing setting of fabric 130. Fibre channel fabrics such as fabric 130 are discussed in further detail below, but in general fabric 130 is a collection of switches or other networking devices used to route connections between VMs of Host 120 and Storage 140.

Zoning table module 116 is a software routine executing within orchestration engine 110 that monitors and analyzes zoning tables of fabric 130. Additionally, the zoning tables of fabric 130 may be stored on orchestration engine 110 by zoning table module 116. The information of the zoning tables is used by methodology module 118 to determine new zoning methodologies for fabric 130.

Methodology module 118 is a software routine executing within orchestration engine 110 that analyzes zoning table information, as well as a set of local rules, to determine if the current zoning methodology in use by fabric 130 compliant with the local rules given the zoning table information. As discussed in further detail below, there are several different zoning methodologies that may be in use on fabric 130. In general, if methodology module 118 determines a new zoning methodology is needed, methodology module 118 instructs fabric interface 114 to implement the new zoning methodology on fabric 130.

Host 120 is a computing device within VM datacenter 100 that provides processing resources for one or more VMs. In this example, host 120 includes one VM, VM 122. In turn, VM 122 has been allocated two VIOS, VIOS 1 and VIOS 2, each with two ports. In other examples, the ports of VIOS 1 and VIOS 2 may be physical ports of the VIOS while in still other examples the ports may be virtual FC ports of the VM. While host 120 provides processing resources for VM 122, the storage resources for VM 122 are provided by storage 140.

Storage 140 is a storage area network (SAN) comprising one or more physical storage devices such as hard disks or magnetic tapes. If storage 140 consists of physical hard disks, the hard disks may be connected in a redundant array of independent disks (RAID). Storage 140 includes, as shown, four nodes 1-4. Each node is an access point for ports associated with VMs, but may or may not correspond to a particular device within storage 140.

In this example, VM manager 112 has provisioned nodes 1-4 as storage for ports 1-4 of VM 122. Fabric 130 is used to connect each port to its provisioned storage node. In particular, port 1 is connected to node 3 via connection 132, port 2 is connected to node 1 via connection 134, port 3 is connected to node 2 via connection 136, and port 4 is connected to node 4 via connection 138. As noted above, each of ports 1-4 may be physical ports of their respective VIOS, or may be virtual FC ports of the VM. In this example, each of connections 132, 134, 136 and 138 are a zone unto themselves, as shown by the different line dashing of each connection. When each initiator (corresponding to a port) and each target (corresponding to a node) are a unique zone, the zoning scheme in use is initiator-target zoning. Initiator-target zoning is discussed in further detail below with respect to other zoning methodologies, but in general initiator-target zoning is the most secure zoning methodology (given the low level of visibility for entities within a zone) and so initiator-target zoning may be preferred in the absence of other considerations, such as zoning table capacity.

Figure 2A:
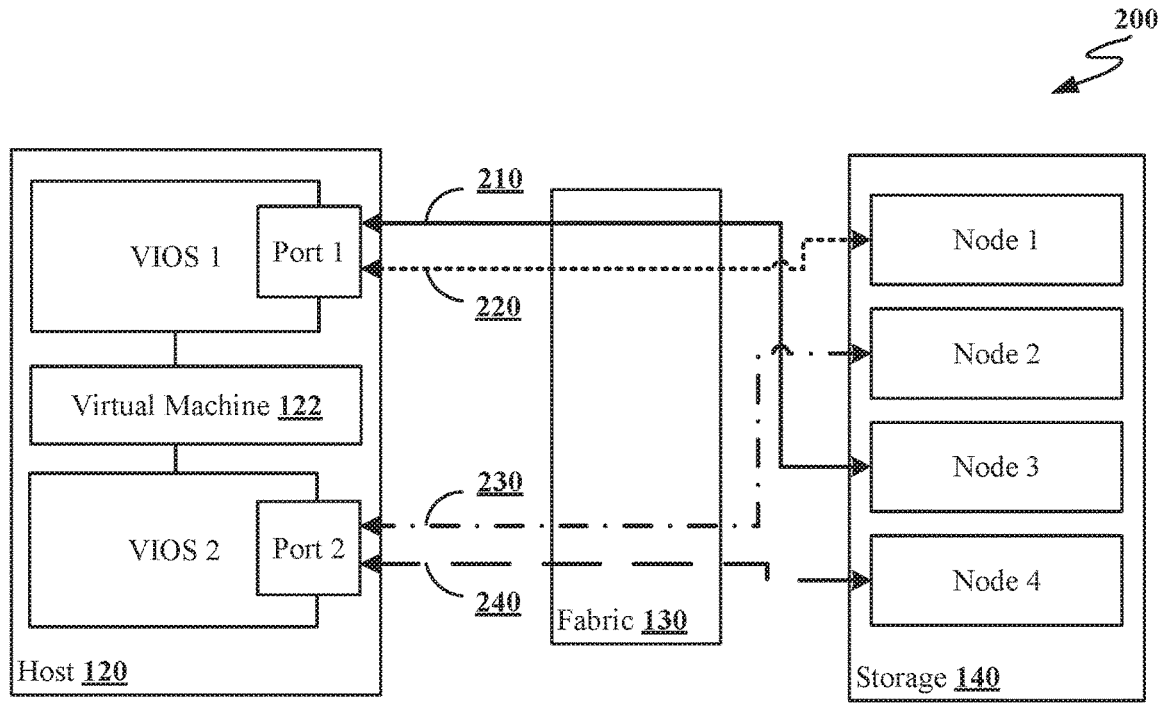
FIG. 2A depicts an example VM datacenter using initiator-target zoning.

FIG. 2A depicts an example VM datacenter 200 using initiator-target zoning. As discussed with respect to FIG. 1, initiator-target zoning may be preferred due to security. As in FIG. 1, the four connections of VM datacenter 200, shown as 210, 220, 230 and 240, each make a unique zone. Unlike VM datacenter 100 of FIG. 1, VM 122 is associated with just two ports, port 1 and port 2. In this example, both port 1 and port 2 are connected to two nodes. Port 1 is connected to node 3 via connection 210 and to node 1 via connection 220. Port 2 is connected to node 2 via connection 230 and to node 4 via connection 240. In general, when using initiator-target zoning each zone includes exactly one port and exactly one node.

Figure 2B:
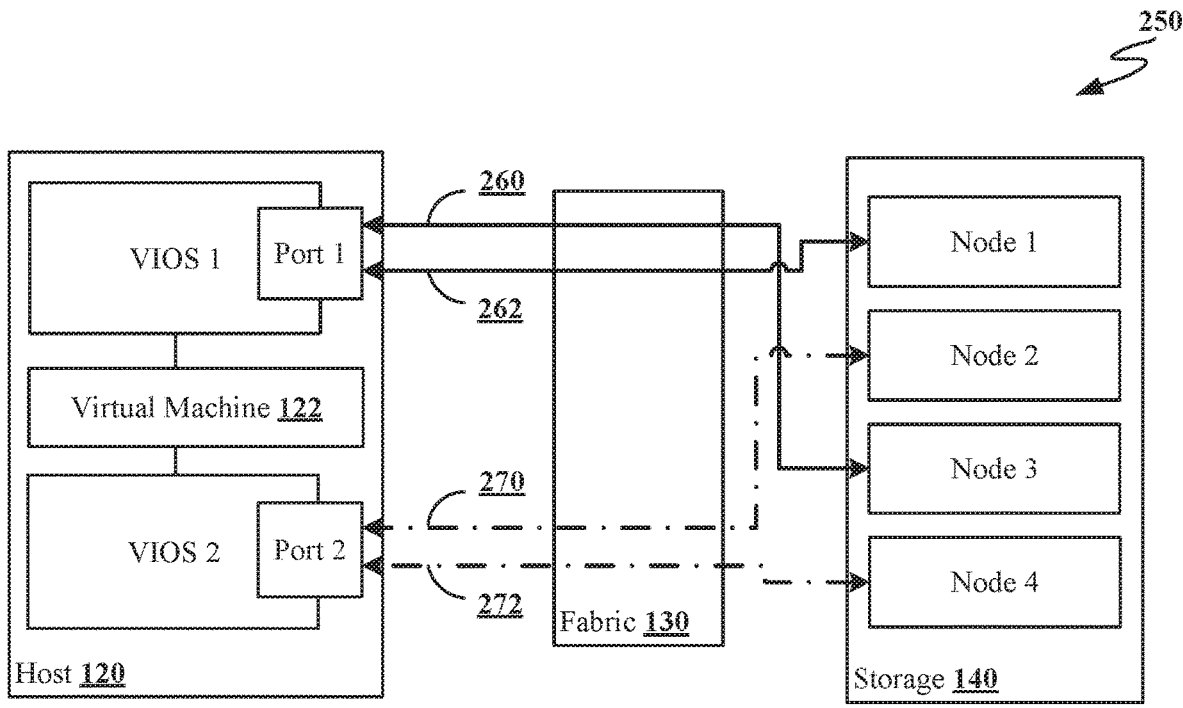
FIG. 2B depicts a VM datacenter using initiator zoning.

FIG. 2B depicts an example VM datacenter 250 using initiator zoning. In particular, VM datacenter 250 represents VM datacenter 200 of FIG. 2A after a change in zoning methodology, from initiator-target zoning to initiator zoning. VM Datacenter 250 still includes port 1 and port 2 each with two connections to storage node. However, as shown by the change in line dotting, the connections of port 1 to node 3 (260) and of port 1 to node 1 (connection 262) are now within the same zone. Similarly, the connections of port 2 to node 2 (connection 270) and of port 2 to node 4 (connection 272) are within a different zone.

Initiator zoning is a zoning methodology which zones together all connections from a particular initiator (a particular port). In this example, connections 260 and 262 are in a zone as they both have port 1 as an initiator, while connections 270 and 272 are in a zone as they both have port 2 as an initiator. Like initiator-target zoning, each zone in initiator zoning includes one initiator, but unlike initiator-target zoning, each zone in initiator zoning may include many targets. Because zoning affects visibility of zoned entities, in this example VIOS 1, node 1 and node 3 are all visible to one another, while VIOS 2, node 2 and node 4 are all visible to one another. Initiator zoning is generally less secure than initiator-target zoning (due to increased visibility among zoned entities). However, initiator zoning is still relatively secure compared to other zoning methodologies, and may save a good deal of zoning table space compared to initiator-target zoning. For example, if an orchestration engine analyzes a nearly full zoning table for a fabric using initiator zoning, in order to avoid zoning table overflow the orchestration engine may change the zoning methodology of the fabric from initiator zoning to initiator-target zoning.

Figure 3A:
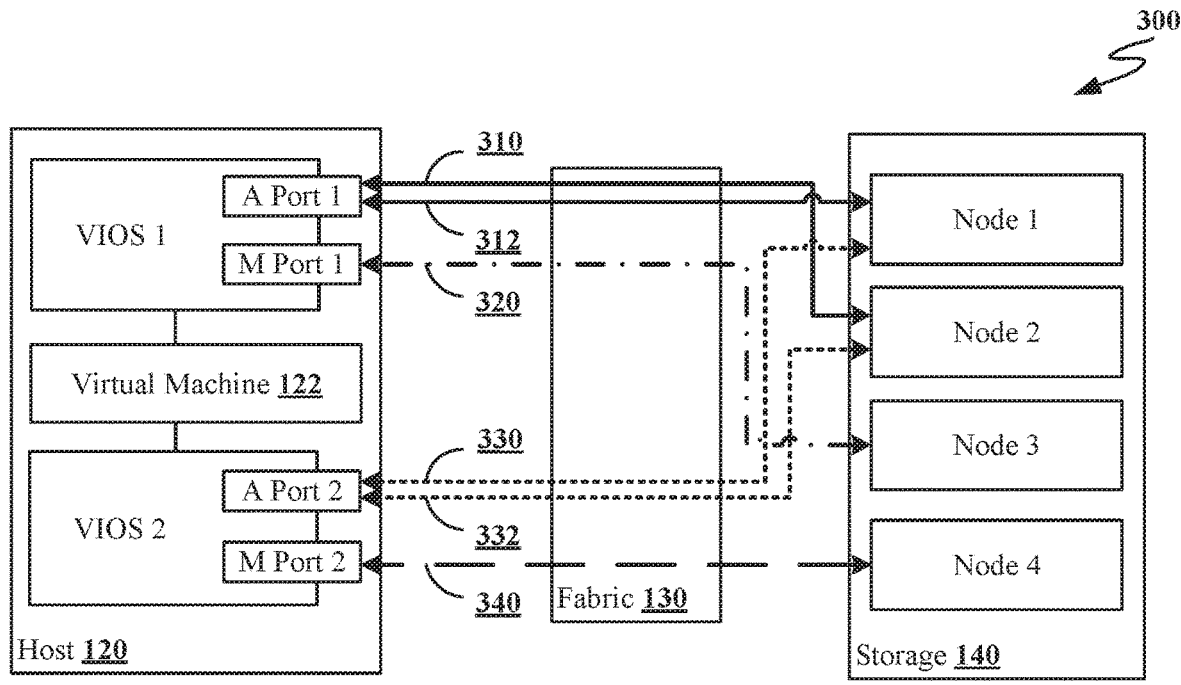
FIG. 3A depicts an example VM datacenter using initiator zoning.

FIG. 3A depicts an example VM datacenter 300 using initiator zoning. In this example, VIOS 1 and VIOS 2 of VM 122 include two ports each, an active port (A port) and a migration port (M port). A VIOS may have an A port and an M port when the VIOS uses a virtual fibre channel (VFC), in order to enable migration of the VIOS from one storage node to another.

In this example, initiator zoning is used, meaning each port is within a separate zone from the other ports. In particular, zone 1 consists of connections 310 and 312 (from A port 1 to node 2 and node 1, respectively), zone 2 consists of connection 320 (from M port 1 to node 3), zone 3 consists of connections 330 and 332 (from A port 2 to node 1 and node 2, respectively), and zone 4 consists of connection 340 (from M port 2 to node 4). However, using initiator zoning in this situation may be inefficient, as migration from one storage node to another may be impeded by the A port and the M port of a VIOS being in separate zones.

Figure 3B:
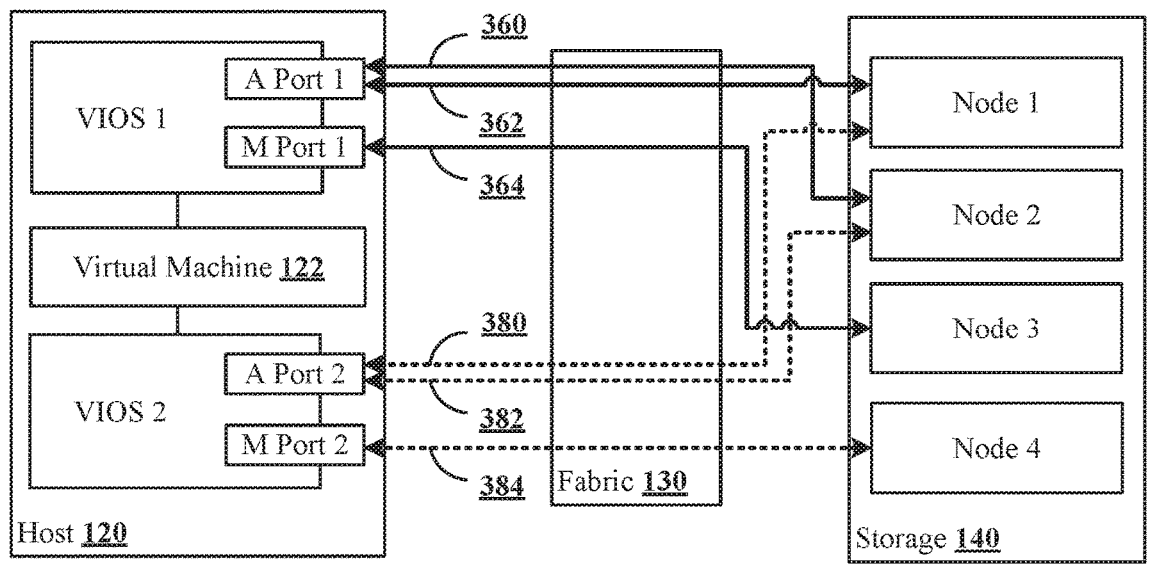
FIG. 3B depicts a VM datacenter using initiator-VFC zoning.

FIG. 3B depicts an VM datacenter 350 using initiator-VFC zoning. VM datacenter 350 represents VM datacenter 300 of FIG. 3A after a change in zoning methodology from initiator zoning to initiator-VFC zoning. Initiator-VFC zoning specifies that all initiators and targets associated with a particular VFC connection (having at least an A port and an M port) are to be zoned tougher. In this example, VM datacenter 350 has two zones when zoned using initiator-VFC zoning. Broadly speaking, the zones are for VIOS 1 and VIOS 2 respectively. In particular, zone 1 is connections 360, 362 and 364 (all connections of A port 1 and M port 1) and zone 2 is connections 380, 382 and 384 (all connections of A port 2 and M port 2).

Initiator-VFC zoning is less secure (due to increased visibility of zoned entities) than either initiator zoning or initiator-target zoning. However, due the requirements for use of VFC, neither initiator zoning nor initiator-target zoning may be suitable for VM datacenters making use of VFC, because A ports and M ports are not zoned together in either initiator zoning or initiator-target zoning. Thus, initiator-target zoning may be the most secure zoning methodology for such VM datacenters. For example, if an orchestration engine analyzes a VM datacenter designed to use VFC and determines a fabric for that VM datacenter is using initiator zoning, in order to allow for proper use of VFC the orchestration engine may change the zoning methodology of the fabric from initiator zoning to initiator-VFC zoning.

Another zoning methodology related to initiator zoning, but not depicted herein, is initiator-peer zoning. Initiator-peer zoning is a zoning methodology where all connections with a common target are zoned together. For example, as shown in FIG. 3A, node 1 has two connections, 312 and 330, and node 2 also has two connections, 310 and 332. Under initiator-peer zoning, connections 312 and 330 would comprise a first zone while connections 310 and 332 would comprise a second zone. In that example, connections 320 and 340 would each comprise a zone including one connection. Imitator-peer zoning is likely to result in fewer total zones compared to initiator zoning, as a datacenter frequently has more VMs at any one time than distinct storage nodes. However, initiator-peer zoning may be preferred for certain applications, such as where multiple processes across a plurality of VMs (or host machines) should have access to the same storage.

Other zoning methodologies may be used, in addition to initiator-target zoning, initiator zoning, initiator-peer zoning and initiator-VFC zoning described above. One such zoning methodology is initiator-host zoning, where all connections from one host machine are zoned together. Initiator-host zoning results in a relatively small number of zones compared to initiator zoning or initiator-peer zoning, and may be used when one entity controls all VMs of an entire host machine. Another zoning methodology is initiator-cluster zoning. In initiator-cluster zoning, all connections from all VMs with a cluster of host machines are zoned together. Initiator-cluster zoning results in the smallest number of zones compared to other zoning methodologies (apart from all connections being in a single zone). Thus, initiator-cluster zoning may be used during periods of heavy load on the VM datacenter, or may be used if a single entity controls all the VMs of multiple clustered host machines.

Figure 4:
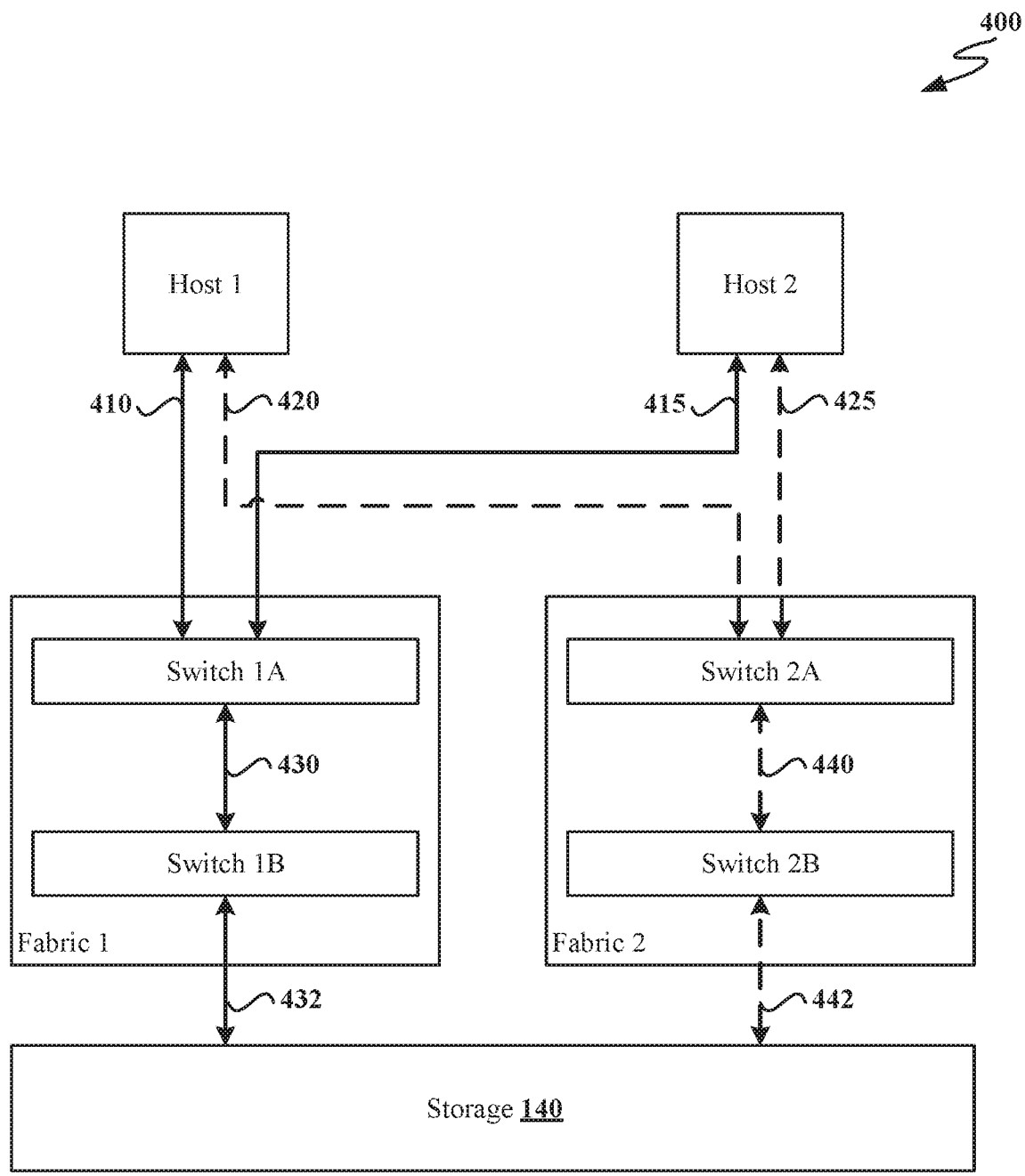
FIG. 4 depicts a VM datacenter with a two fabric architecture.

FIG. 4 depicts a VM datacenter 400 with a two fabric architecture. VM datacenter 400 includes two host machines (host 1 and host 2), two fabrics (fabric 1 and fabric 2) and storage 140. The activity of VM datacenter 400 is controlled by an orchestration engine (not shown), such as orchestration engine 110 of FIG. 1. In this simplified example each fabric in VM datacenter 400 includes two switches, fabric 1 includes switch 1A and switch 1B, while fabric 2 includes switch 2A and switch 2B. In other examples, however, a fabric many include a plurality of other networking appliances such as routers, or many include more switches than shown in this example.

In VM datacenter 400, each host makes two connections to storage 140, one each through the two switches. Host 1 is connected to fabric 1 by connection 410 and is connected to fabric 2 by connection 420. Host 2 is connected to fabric 1 by connection 415 and is connected to fabric 2 by connection 425. Each of connections 410, 415, 420 and 425 connect VMs (not shown) of hosts 1 and 2 to storage 140.

Internal to fabric 1, switch 1A routes connections to switch 1B via connection 430. Switch 1B thereafter routes connections to nodes within storage 140 via connection 432. Similarly, within fabric 2, switch 2A routes connections to switch 2B via connection 440, which are then routed to nodes of storage 140 via connection 442.

In this example, line dotting is used to distinguish the paths of connections through fabric 1 (connections 410, 415, 430 and 432) and the paths of connections through fabric 2 (connections 420, 425, 440 and 442). As discussed above, connections through a fabric may be zoned using a variety of zoning methodologies. However, in addition, zones can be established by the orchestration engine across multiple fabrics. For example, the orchestration engine can implement initiator-host zoning across fabric 1 and fabric 2. If so, connections 410 and 420 would comprise one zone (due to originating from the same host machine), despite connections 410 and 420 being routed through separate fabrics. Similarly, in such a system connections 415 and 425 would comprise a second zone.

Figure 5:
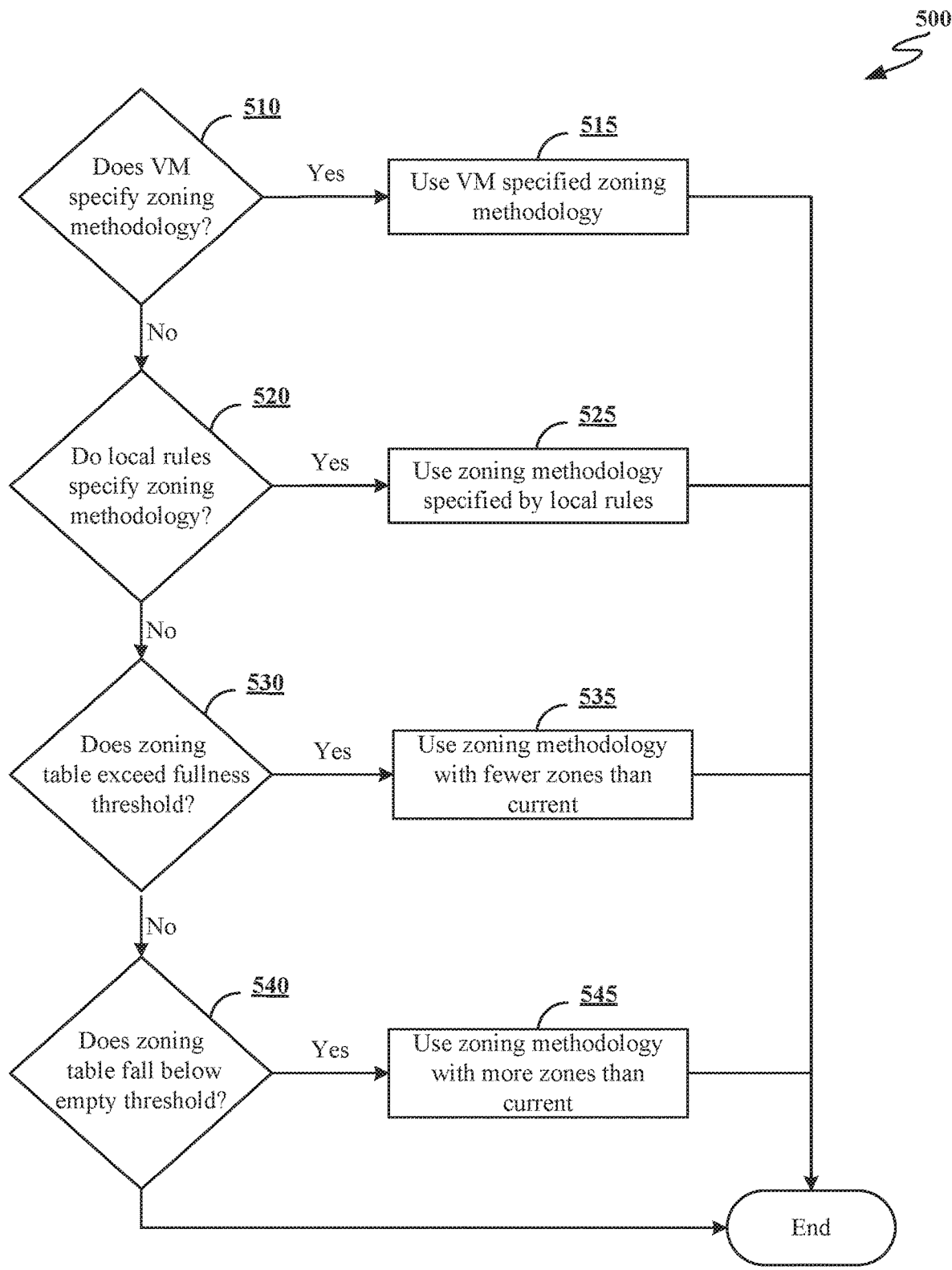
FIG. 5 is a flow chart of an example method for selecting a zoning methodology.

FIG. 5 is a flow chart of an example method 500 for selecting a zoning methodology. Method 500 may be performed by an orchestration engine operating within a VM datacenter, such as orchestration engine 110 of FIG. 1. Method 500 may be performed after the orchestration engine receives a request to provision storage for a VM. Zones are used in allocating storage for VMs in the VM datacenter. In some examples, storage nodes may be zoned to ports of a particular host machine owning the VMs, rather than to virtual FC ports of VMs, as discussed above.

Method 500 begins at 510, where the orchestration engine determines if the VM specifies a particular zoning methodology. In general, if a VM specifies a zoning methodology for use on the VM at the time of creation, that zoning methodology is implemented by the orchestration engine. If the VM does specify a zoning methodology, the orchestration engine proceeds to 515, where the VM specified zoning methodology is implemented by the orchestration engine for the VM. In some cases, this implementation may involve only the VM itself (e.g., if the VM specifies initiator-target zoning). In other cases (e.g., initiator-host zoning) the implementation may involve other VMs within the VM datacenter. If the VM does not specify a zoning methodology to use, method 500 proceeds to 520.

At 520 the orchestration engine determines if local rules of the orchestration engine specify a zoning methodology.

The local rules may be created by an entity owning, renting or otherwise controlling VMs in a VM datacenter. The local rules may be a single rule for all situations or a set of conditional rules intended to cover multiple situations. A set of example rules may include using initiator-cluster zoning if the VM is a member of a cluster, or using initiator-peer zoning if the fabric of the VM supports initiator-peer zoning. Local rules may depend on capabilities of a switch within the fabric. For example, a rule may specify the use of initiator-peer zoning if the switch supports peer zoning and has virtual small computer system interface (VSCSI) connectivity. VSCSI is a virtual implementation of the small computer system interface (SCSI) standard. In VSCSI an accessed disk may be a physical SCSI disk, or a file or volume of a VIOS. If the orchestration engine determines the local rules specify a zoning methodology for the current state of the VM datacenter, method 500 proceeds to 525, where the orchestration engine implements the specified zoning methodology. If the local rules do not specify a zoning methodology, method 500 proceeds to 530.

At 530, the orchestration engine determines if a zoning table of the fabric exceeds a fullness threshold. For example, if the fullness threshold is 90% of zoning table capacity, and the zoning table is currently at 91% capacity, the fullness threshold is exceeded. If the fullness threshold is exceeded, method 500 proceeds to 535. At 535, the orchestration implements a zoning methodology that results in fewer zones than the current methodology, and thus lowers the fullness of the zoning table. In general, initiator-target zoning results in the most zones, followed by initiator zoning, initiator-VFC zoning, initiator-peer zoning, initiator-host zoning and finally initiator-cluster zoning. If the zoning table does not exceed the fullness threshold, method 500 proceeds to 540.

At 540 the orchestration engine determines if the zoning table is below an empty threshold. If the zoning table is below the empty threshold it indicates the zoning table currently has capacity to implement a zoning methodology with more zones, which generally means a zoning methodology with reduced visibility between entities and thus more security. If the zoning table is below the empty threshold, method 500 proceeds to 545, where the orchestration engine implements a zoning methodology resulting in more zones than the currently used zoning methodology. If the zoning table is not below the empty threshold, the currently used zoning methodology is acceptable, and method 500 ends.

Figure 6:
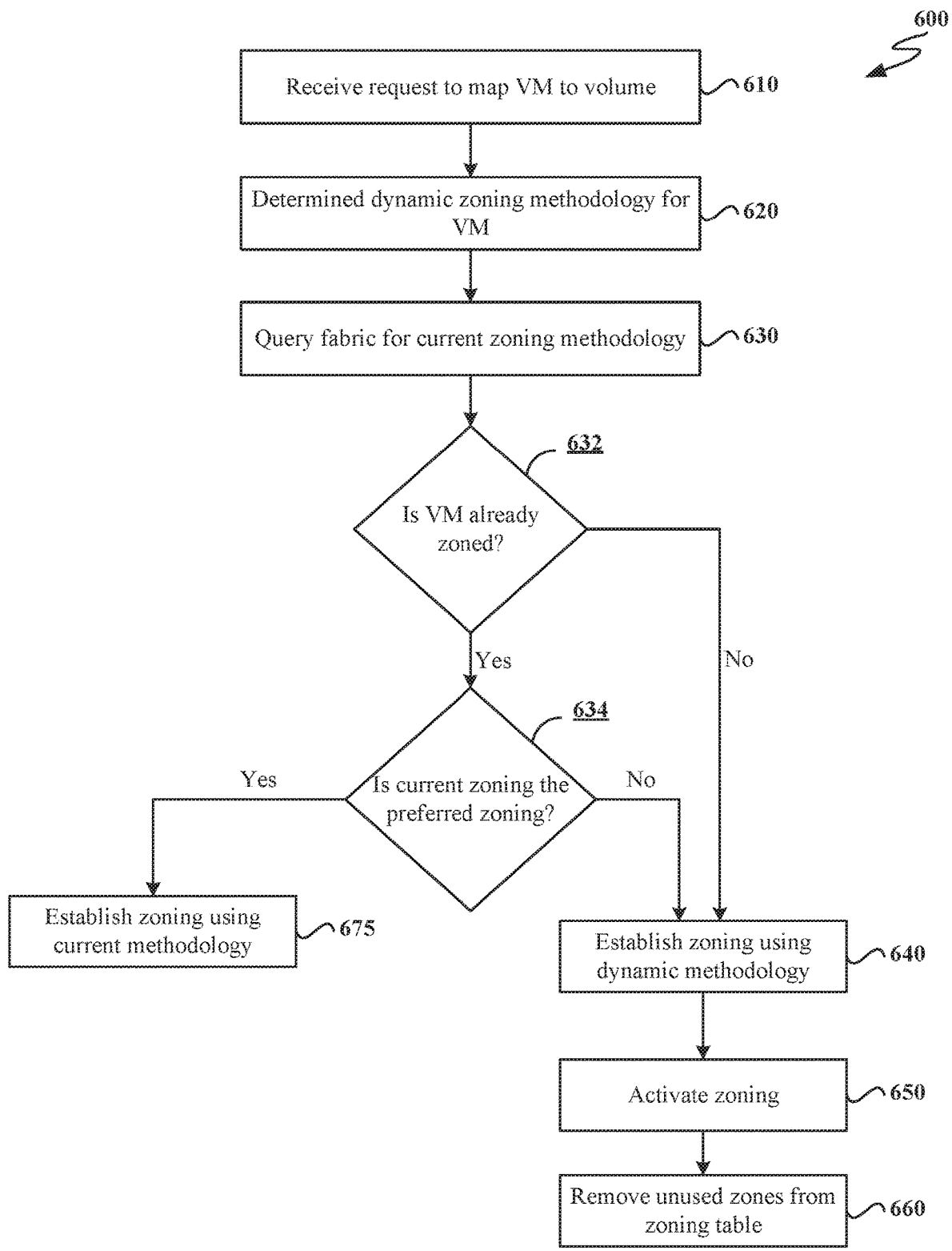
FIG. 6 is a flow chart of an example method for implementing a dynamically selected zoning methodology.

FIG. 6 is a flow chart of an example method for implementing a dynamically selected zoning methodology. Method 600 may be performed by an orchestration engine operating controlling a FC fabric, such as orchestration engine 110 of FIG. 1. Method 600 begins at 610, where the orchestration engine receives a request to map a VM to a storage volume. As part of provisioning storage for the VM, at 620 the orchestration engine dynamically determines a zoning methodology for the VM. 620 may correspond with method 500 of FIG. 5.

At 630, the orchestration engine queries the fabric for the currently used zoning methodology on the fabric. As discussed above, there are a variety of different zoning methodologies that may be used on the fabric. Based on the result of this query, at 632 the orchestration engine determines if the VM is already zoned.

If the VM is already zoned within the fabric (meaning that the VM is being zoned to an additional storage node rather than a newly created VM), method 600 proceeds to 634, where the orchestration engine determines if the current zoning methodology on the fabric, as determined at 630, is the same as the preferred zoning methodology, determined at 620. If the preferred zoning methodology is the same as the current zoning methodology, method 600 proceeds to 675, where the orchestration engine establishes zoning for the VM using the current zoning methodology. For certain zoning methodologies (e.g., initiator-peer zoning) this may involve moving the VM to an existing zone of the fabric. For other zoning methodologies (e.g., initiator-target zoning) this may involve creating a new zone for the VM.

Returning to 632, if the VM is not already zoned within the fabric, method 600 proceeds to 640. Method 600 also proceeds to 640 from 634 if the current zoning is not the preferred zoning. At 640 the orchestration engine establishes zoning using the dynamically determined zoning methodology. Establishing the dynamically determined zoning methodology involves determining which connections of the fabric should be zoned together according to the dynamically determined zoning methodology, and adding these new zones to the zoning table. In some cases, the orchestration engine may generate an entirely new zoning table that defines the new zones and the membership (VMs and storage nodes) of the new zones.

Method 600 then proceeds to 650, where the orchestration engine activates the new zones determined at 640, meaning the new zones are used by the fabric in determining visibility for the members of the zones. Then, at 660, the orchestration engine removes previous, and now unneeded, zones from the zoning table. In the case that an entirely new zoning table is generated, the orchestration engine instead discards the older zoning table in favor of the new zoning table.

Figure 7:
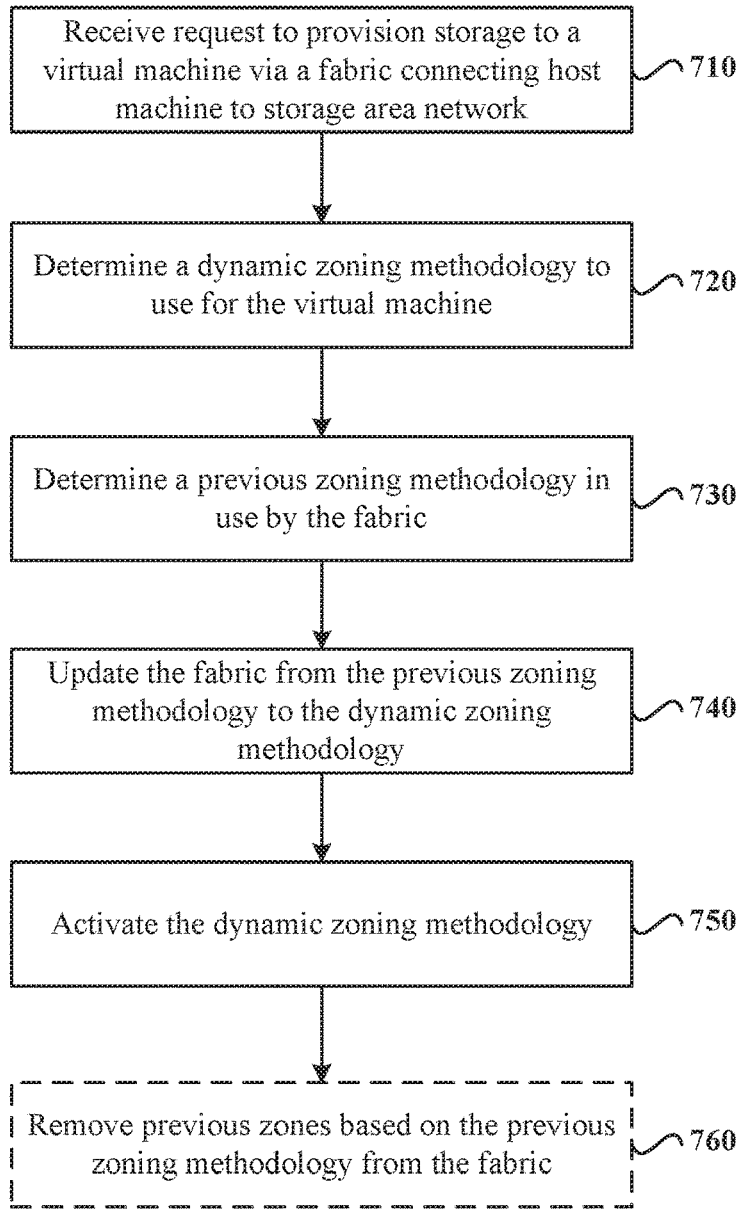
FIG. 7 is a flow chart of an example method for dynamically updating a zoning methodology.

FIG. 7 is a flow chart of an example method for dynamically updating a zoning methodology. Method 700 may be performed by an orchestration engine operating within a VM datacenter, such as orchestration engine 110 of FIG. 1. Method 700 begins at 710, where the orchestration engine receives a request to provision storage to a VM within the VM datacenter. In general this involves selecting a storage node from a SAN for use by the VM, and establishing a connection between the VM and the storage node.

At 720, the orchestration engine determines a dynamic zoning methodology to use for the VM, using the methods discussed above. In particular 720 may correspond to method 500 of FIG. 5. In general the dynamic zoning methodology is generated without input by an owner or administrator of the VM datacenter, and is instead generates autonomously by the orchestration engine. In some cases, rather than dynamically determining a zoning methodology for use when provisioning storage for a VM, the orchestration engine may periodically check the status of a fabric of the VM, to determine if a change in zoning methodology is appropriate.

At 730, the orchestration engine determines a previous zoning methodology in use by the fabric connecting the storage to a host device of the virtual machine. The previous zoning methodology is compared to the dynamically determined methodology to check if the two methodologies are the same. If they are, no update to the fabric may be needed. Otherwise, method 700 proceeds to 740, where the orchestration engine updates the fabric from the previous zoning methodology to the dynamic zoning methodology. This may involve modifying settings or parameters of the fabric itself, modifying entries of the zoning table for the fabric, or generating an entirely new zoning table for the fabric.

At 760, the orchestration engine activates the dynamic zoning scheme, which typically involves specifying new entries in the zoning table of the fabric as the entries to be used. In some examples of method 700, the orchestration engine also, at 770, removes the previous zones from the previous zoning methodology from the zoning table.

Figure 8:
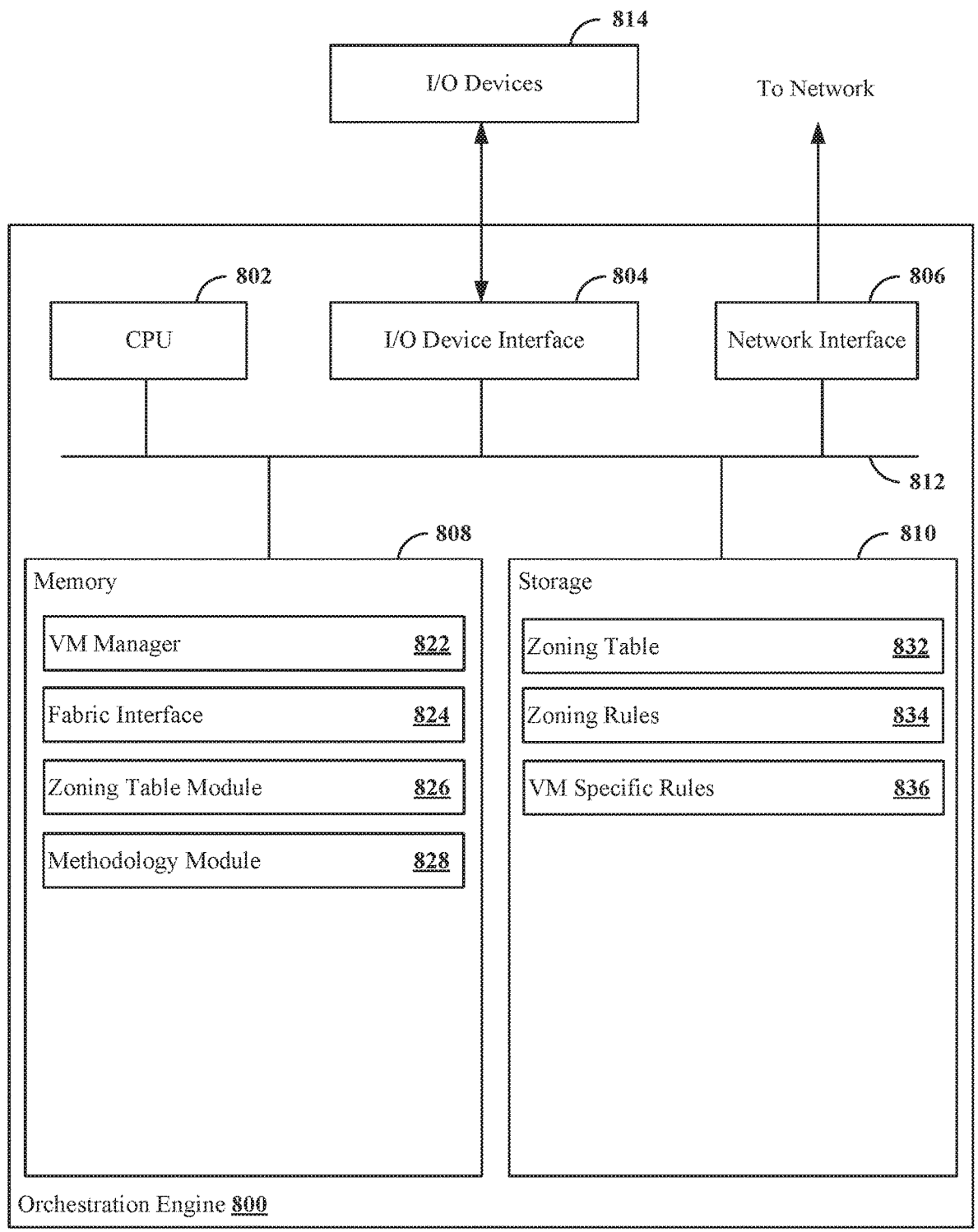
FIG. 8 is a block diagram of an example orchestration engine.

FIG. 8 is a block diagram of example orchestration engine 800. As shown, orchestration engine 800 includes, without limitation, central processing unit (CPU) 802, one or more input/output (I/O) device interfaces 804, which may allow for the connection of various I/O devices 814 (e.g., keyboards, displays, mouse devices, pen input, etc.) to the orchestration engine 800, network interface 806, memory 808, storage 810, and interconnect 812.

CPU 802 may retrieve and execute programming instructions stored in memory 808. Similarly, CPU 802 may retrieve and store application data residing in memory 808. Interconnect 812 transmits programming instructions and application data, among CPU 802, I/O device interface 804, network interface 806, memory 808, and storage 810. CPU 802 is included to be representative of a single CPU, multiple CPUs, a single CPU having multiple processing cores, and the like. I/O device interface 804 may provide an interface for capturing data from one or more input devices integrated into or connected to orchestration engine 800, such as keyboards, mice, touchscreens, and so on. Memory 808 may represent a random access memory (RAM), while storage 810 may be a solid state drive, for example. Although shown as a single unit, storage 810 may be a combination of fixed and/or removable storage devices, such as fixed drives, removable memory cards, network attached storage (NAS), or cloud-based storage.

As shown, memory 808 includes VM manager 822, fabric interface 824, zoning table module 826 and methodology module 828. VM manager 822, fabric interface 824, zoning table module 826 and methodology module 828 are software routines executed based on instructions which may be stored in the storage 810. Such instructions may be executed by the CPU 802.

As shown, storage 810 includes zoning table 832, local rules 834 and VM specific rules 836. In general, VM manager 822 receives a request, such as via network interface 806, to provision storage for a VM. VM manager 822 then obtain VM specific rules 836 from the VM, and fabric interface 824 obtains zoning table 832 and local rules 834 from the fabric. Methodology module 828 then uses zoning table 832, local rules 834 and VM specific rules 836 to determine a dynamic zoning methodology. Zoning table module 826 then modifies zoning table 832 to implement the dynamic zoning methodology, and fabric interface 824 send the modified zoning table 832 to the fabric for activation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a request to provision storage to a virtual machine (VM) via a fibre channel (FC) fabric connecting a host machine of the VM to a storage area network (SAN);
   determining a dynamic zoning methodology to use for the VM;
   determining a previous zoning methodology in use by the fabric;
   updating the FC fabric from the previous zoning methodology to the dynamic zoning methodology by modifying a zoning table of the FC fabric;
   activating the dynamic zoning methodology on the FC fabric;
   following activating the dynamic zoning methodology on the FC fabric, periodically determining if the dynamic zoning methodology complies with local zoning rules of the FC fabric;
   determining the dynamic zoning methodology does not comply with the local zoning rules;
   determining a second dynamic zoning methodology; and
   updating the FC fabric from the dynamic zoning methodology to the second dynamic zoning methodology.

2. The method of claim 1, further comprising removing previous zones of the previous zoning methodology from the zoning table.

3. The method of claim 1, wherein the dynamic zoning methodology is one of:
   initiator-target zoning;
   initiator zoning;
   initiator-VFC zoning;
   initiator-host zoning;
   initiator-peer zoning; or
   initiator-cluster zoning.

4. The method of claim 1, wherein at least a second host machine including at least a second VM is connected to the SAN via a second FC fabric.

5. The method of claim 4, further comprising updating the second FC fabric from the previous zoning methodology to the dynamic zoning methodology.

6. The method of claim 1, wherein determining the dynamic zoning methodology to use for the VM comprises comparing a current state of the FC fabric with one of:
   VM specific zoning rules; or
   local zoning rules of the FC fabric.

7. The method of claim 1, wherein determining the dynamic zoning methodology to use for the VM comprises comparing the zoning table with a fullness threshold.

8. The method of claim 1, wherein determining the dynamic zoning methodology to use for the VM comprises comparing the zoning table with an empty threshold.

9. A system, comprising:
   a processor; and
   a memory including computer readable instructions, which, when executed by the processor, cause the system to perform a method comprising:
      receiving a request to provision storage to a virtual machine (VM) via a fibre channel (FC) fabric connecting a host machine of the VM to a storage area network (SAN);
      determining a dynamic zoning methodology to use for the VM;
      determining a previous zoning methodology in use by the fabric;
      updating the FC fabric from the previous zoning methodology to the dynamic zoning methodology by modifying a zoning table of the FC fabric;
      activating the dynamic zoning methodology on the FC fabric;
      following activating the dynamic zoning methodology on the FC fabric, periodically determining if the dynamic zoning methodology complies with local zoning rules of the FC fabric;
      determining the dynamic zoning methodology does not comply with the local zoning rules;
      determining a second dynamic zoning methodology; and
      updating the FC fabric from the dynamic zoning methodology to the second dynamic zoning methodology.

10. The system of claim 9, the method further comprising removing previous zones of the previous zoning methodology from the zoning table.

11. The system of claim 9, wherein the dynamic zoning methodology is one of:
    initiator-target zoning;
    initiator zoning;
    initiator-VFC zoning;
    initiator-host zoning;
    initiator-peer zoning; or
    initiator-cluster zoning.

12. The system of claim 9, wherein at least a second host machine including at least a second VM is connected to the SAN via a second FC fabric.

13. The system of claim 12, the method further comprising updating the second FC fabric from the previous zoning methodology to the dynamic zoning methodology.

14. The system of claim 9, wherein determining the dynamic zoning methodology to use for the VM comprises comparing a current state of the FC fabric with one of:
    VM specific zoning rules; or
    local zoning rules of the FC fabric.

15. A computer program product for dynamically updating a zoning methodology, the computer program product comprising:
    a non-transitory computer-readable storage medium having computer-readable program code embodied therewith, the computer-readable program code executable by one or more computer processors to:
       receive a request to provision storage to a virtual machine (VM) via a fibre channel (FC) fabric connecting a host machine of the VM to a storage area network (SAN);
       determine a dynamic zoning methodology to use for the VM;
       determine a previous zoning methodology in use by the fabric;
       update the FC fabric from the previous zoning methodology to the dynamic zoning methodology by modifying a zoning table of the FC fabric;

activate the dynamic zoning methodology on the FC fabric;
following activating the dynamic zoning methodology on the FC fabric,
determine the dynamic zoning methodology does not comply with local zoning rules of the FC fabric;
determine a second dynamic zoning methodology; and
update the FC fabric from the dynamic zoning methodology to the second dynamic zoning methodology.

* * * * *